Figure 1:
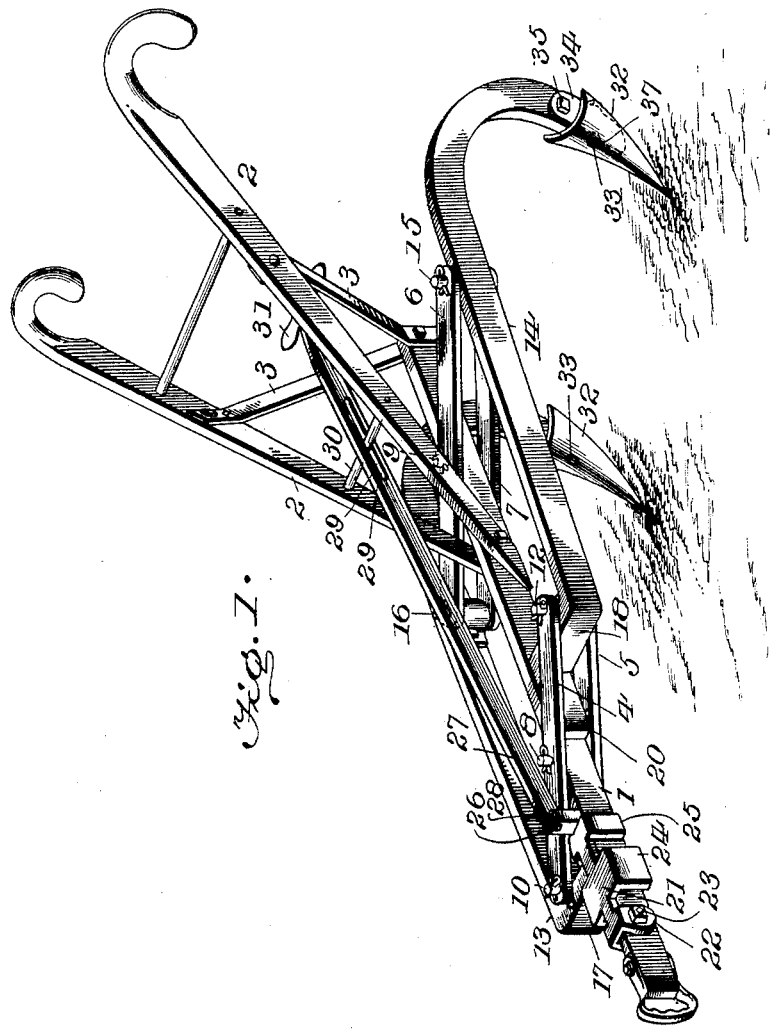

(No Model.) 2 Sheets—Sheet 1.

J. T. DRUMMOND.
DOUBLE SHOVEL PLOW.

No. 595,237. Patented Dec. 7, 1897.

Witnesses

Inventor
John T. Drummond
by James L. Norris.
his Attorney (No Model.) 2 Sheets—Sheet 2.
J. T. DRUMMOND.
DOUBLE SHOVEL PLOW.
No. 595,237. Patented Dec. 7, 1897.
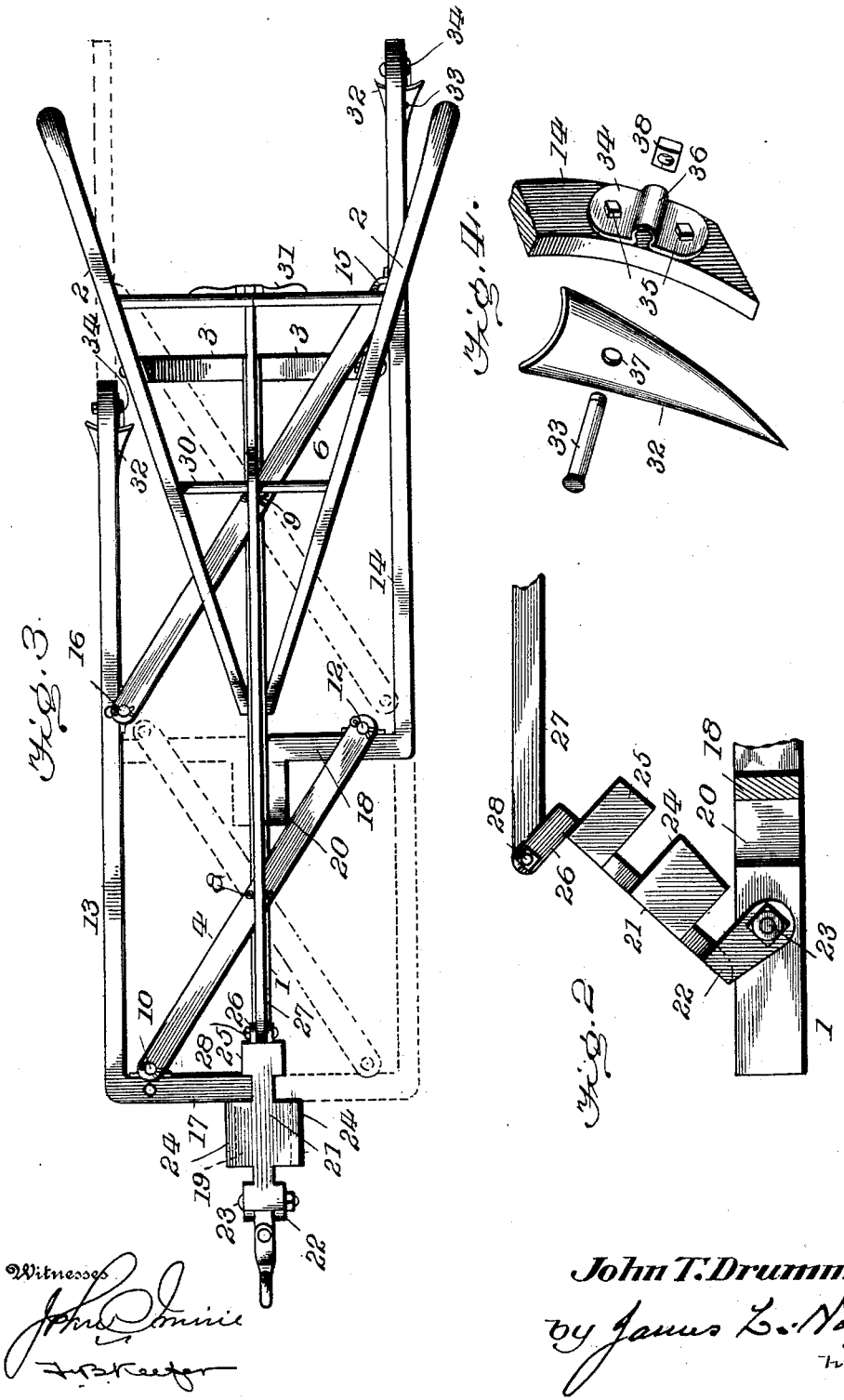
Witnesses
Inventor
John T. Drummond
by James L. Norris.
His Attorney

UNITED STATES PATENT OFFICE.

JOHN T. DRUMMOND, OF ASHEVILLE, NORTH CAROLINA.

DOUBLE-SHOVEL PLOW.

SPECIFICATION forming part of Letters Patent No. 595,237, dated December 7, 1897.

Application filed April 14, 1897. Serial No. 632,140. (No model.)

*To all whom it may concern:*

Be it known that I, JOHN T. DRUMMOND, a citizen of the United States, residing at Asheville, in the county of Buncombe and State of North Carolina, have invented new and useful Improvements in Double-Shovel Plows, of which the following is a specification.

This invention relates to duplex or double-shovel plows designed for cultivating cotton, tobacco, corn, and other plants and wherein two plow-beams have a parallel motion relatively to a central main beam or frame for the purpose of shifting either plow in advance of the other by longitudinal movements of the plow-beams in lines parallel with the main beam.

The chief objects of my present invention are to improve duplex or double-shovel plows of the character referred to and to provide novel, simple, economical, and easily-operated devices for engaging and holding or locking the plow-beams rigidly with relation to the main beam after the plows have been shifted to the desired position to suit the conditions required.

The object of my invention is accomplished in the manner and by the means hereinafter described and claimed, reference being made to the accompanying drawings, in which—

Figure 1 is a perspective view of a duplex or double-shovel plow embodying my invention, the plows being represented in one position by full lines and indicated in another position by dotted lines; and Fig. 2 is a detail perspective view of the locking device, showing the same elevated, as when it is moved to release the plow-beams, so that they may be shifted to place one plow in advance of the other. Fig. 3 is a plan view showing the plows by full lines in one position and by dotted lines indicating them in another position; and Fig. 4 is a detail perspective view of a portion of one of the plow-beams, a plow, and the devices for detachably securing the plow to the beam.

In order to enable those skilled in the art to make and use my invention, I will now describe the same in detail, referring to the drawings, wherein—

The numeral 1 indicates a central longitudinal main beam having suitable handle-bars 2, supported and braced through the medium of brace-rods 3, preferably of such construction that the handle-bars can be raised or lowered to vary the height of the handles. The central beam is provided with front and rear sets of parallel-motion bars, the front set comprising upper and lower bars 4 and 5 and the rear set comprising two bars 6 and 7. The front parallel-motion bars 4 and 5 are pivoted at their center to the main beam through the medium of a vertical pivot bolt or pin 8, and the rear bars 6 and 7 are pivoted at their center to the main beam by a vertical pivot bolt or pin 9. The outer extremities of the bars 4 and 5 are pivotally connected by vertical pivot-pins 10 and 12 with the front end portions of two plow-beams 13 and 14, arranged at opposite sides of the central main beam. The rear portions of the plow-beams are pivotally connected by vertical pivot-pins 15 and 16 with the outer extremities of the bars 6 and 7.

The construction and arrangement of the parallel-motion bars and plow-beams are such that the plow-beams can be moved longitudinally and will constantly remain parallel with the main beam, whereby one plow or shovel can be placed in advance of the other plow or shovel, as conditions may require or circumstances demand.

The front ends of the plow-beams are extended inwardly at right angles to their main bodies, as at 17 and 18, and these right-angled portions are extended forwardly to provide arms 19 and 20, having flat inner surfaces adapted to lie squarely against the opposite sides of the main beam when the plows are adjusted to the desired position. After the plow-beams have been shifted longitudinally to place either plow or shovel in advance of the other the plow-beams must be rigidly secured with relation to the main beam, and this I accomplish in a novel, simple, and economical manner through the medium of a vertically-swinging locking-block 21, which is provided with pendent ears 22, embracing the main beam and pivoted thereto by a horizontal pivot-pin 23, passing through the ears and the beam. The locking-block 21 is constructed with offset pendent lugs 24, in rear of which are a pair of secondary lugs 25, located such distance from the lugs 24 that when the plow-beams are shifted and the arms 19 and 20 bear against the opposite sides of the main beam one of said arms may be engaged with or overlapped by one of the lugs 24, while one of the lugs 23 will bear directly against one of the arms 17 or 18, thereby resisting tendency of such arm to move rearward by reason of back pressure on the plow-shovel.

The locking-block 21 is provided with a vertical stud 26, to which the front end of a lever 27 is pivoted through the medium of a pivot-pin 28. The rear end of the lever 27 is constructed with a longitudinal slot 29, through which a cross-rod or round 30 of the handle-bars extends for the purpose of supporting and guiding the lever and enabling the latter to be rocked in a vertical plane and also to move longitudinally to a limited extent. The rear extremity of the lever is provided with a suitable handle 31, which is susceptible of being conveniently grasped by the operator for the purpose of manipulating the lever to swing the locking-block upward to disengage the locking-block from the front end portion of one of the plow-beams, whereby the plow-beams may be shifted longitudinally and one of them be engaged with and locked by the locking-block, as will be obvious without further explanation.

The plows 32 may be of any desired construction or form, and each is connected with a plow-beam through the medium of a single bolt 33 and a clip-plate 34. (Best seen in Fig. 4.) The clip-plate is detachably secured to either side of the plow-beam by bolts 35, and between these bolts the plate is formed or provided with an approximately cylindrical socket 36, adapted to receive the bolt 33, which extends through the bolt-hole 37 in the plow 32. The rear end of the bolt is secured by a nut 38. The clip-plates can be secured to either side of the plow-beams, and by this means the distance between the plows can be adjusted.

My invention provides a new and improved duplex or double-shovel plow, wherein the plow-beams have a parallel motion, and either one may be locked in connection with the main beam for holding the beams in position to place one plow in advance of the other, as may be required for general cultivating or other purposes.

Having thus described my invention, what I claim is—

1. The combination, in a double-shovel plow, of a main beam, opposite plow-beams, parallel-motion bars pivoted to the main beam and to the plow-beams, each plow-beam having at its front end portion a forwardly-projecting arm, and a locking-block mounted on the plow-beam and having means to engage the forwardly-projecting arm of either plow-beam, substantially as and for the purposes described.

2. The combination, in a double-shovel plow, of a central main beam, opposite plow-beams, parallel-motion bars pivoted to the main beam and to the plow-beams, a vertically-swinging locking-block pivoted to the main beam and having locking-lugs to engage the front end portion of either plow-beam, and a lever for swinging the locking-block vertically, substantially as and for the purposes described.

3. The combination, in a double-shovel plow, of a central main beam, opposite plow-beams, parallel-motion bars pivoted to the main beam and to the plow-beams, a vertically-swinging locking-block pivoted to the main beam and having two pairs of pendent locking-lugs for engaging the front end portion of either plow-beam, and a lever for swinging the locking-block vertically, substantially as and for the purposes described.

4. The combination, in a double-shovel plow, of a main beam, plow-beams having inwardly-projecting portions at their front ends which are provided with forwardly-extending arms adapted to lie against opposite sides of the main beam, parallel-motion bars pivoted to the main beam and to the said inwardly-extending portions of the plow-beams, a locking-block carried by the main beam and having lugs for engaging and disengaging said inwardly and forwardly extending portions of the plow-beams, and means for operating the locking-block, substantially as and for the purposes described.

5. The combination, in a double-shovel plow, of a main beam, opposite plow-beams having forwardly-extending arms at their front end portions, parallel-motion bars pivoted to the main beam and to the plow-beams, a vertically-swinging locking-block pivoted to the main beam and provided with offset pendent locking-lugs and secondary pendent lugs in rear of said offset lugs, and a lever pivoted to the locking-block for swinging the same vertically, substantially as and for the purposes described.

6. The combination with the plow-beams, and the plows having bolt-holes 37, of the detachable clip-plates 34 connected with the plow-beams and constructed with an approximately cylindrical socket 36, and bolts 33 passing through the plows and through the cylindrical sockets of the clip-plates, said clip-plates being adapted to be secured to either side of the plow-beams for varying the distance apart of the plows, substantially as and for the purposes described.

In testimony whereof I have hereunto set my hand in presence of two subscribing witnesses.

JOHN T. DRUMMOND.

Witnesses:
J. D. PENLAND,
HAYWOOD PARKER.